United States Patent
Strandjord et al.

(10) Patent No.: US 10,767,995 B2
(45) Date of Patent: Sep. 8, 2020

(54) HYPERBOLIC MODULATION OFFSET ERROR REDUCER FOR AN RFOG

(71) Applicant: Honeywell International Inc., Morris Plains, NJ (US)

(72) Inventors: Lee K. Strandjord, Tonka Bay, MN (US); Marc Smiciklas, Phoenix, AZ (US); Norman Gerard Tarleton, Glendale, AZ (US); Glen A. Sanders, Scottsdale, AZ (US)

(73) Assignee: Honeywell International Inc., Morris Plains, NJ (US)

( * ) Notice: Subject to any disclaimer, the term of this patent is extended or adjusted under 35 U.S.C. 154(b) by 108 days.

(21) Appl. No.: 16/114,991

(22) Filed: Aug. 28, 2018

(65) Prior Publication Data

US 2020/0072608 A1    Mar. 5, 2020

(51) Int. Cl.
   *G01C 19/72*    (2006.01)
(52) U.S. Cl.
   CPC ......... *G01C 19/721* (2013.01); *G01C 19/723* (2013.01); *G01C 19/726* (2013.01); *G01C 19/727* (2013.01)
(58) Field of Classification Search
   CPC .... G01C 19/72; G01C 19/721; G01C 19/723; G01C 19/726; G01C 19/727
   See application file for complete search history.

(56) References Cited

U.S. PATENT DOCUMENTS

| 4,872,754 A | 10/1989 | Ensley |
| 5,185,642 A * | 2/1993 | Gockler ............... G01C 19/721 356/460 |

(Continued)

FOREIGN PATENT DOCUMENTS

| EP | 2813815 A2 | 12/2014 |
| EP | 3086090 A1 | 10/2016 |

(Continued)

OTHER PUBLICATIONS

European Patent Office, "Extended European Search Report from EP Application No. 19192711.0", from Foreign Counterpart to U.S. Appl. No. 16/114,991, dated Jan. 31, 2020, pp. 1-6, Published: EP.

*Primary Examiner* — Tarifur R Chowdhury
*Assistant Examiner* — Jonathon Cook
(74) *Attorney, Agent, or Firm* — Fogg & Powers LLC

(57) ABSTRACT

A hyperbolic modulation offset reducer circuit for a resonator fiber optic gyro (RFOG) is provided. The circuit includes a first demodulation circuit that is configured to demodulate a received transmission signal from a resonator at twice a sideband heterodyne detection modulation frequency to reject signals due to backscatter. A slave resonance tracking loop of the circuit is coupled to an output of the first demodulation circuit. The slave resonance tracking loop is configured to create an offset frequency signal from the transmission signal that is applied to an optical phase lock loop of a RFOG. A hyperbolic modulator offset control loop is also coupled to the output of the first demodulation circuit. The hyperbolic modulator offset control loop is configured to create a subharmonic common modulation signal from the transmission signal that is coupled to a common phase module in a silicon photonics chip of the RFOG.

9 Claims, 5 Drawing Sheets

(56) References Cited

U.S. PATENT DOCUMENTS

| | | | |
|---|---|---|---|
| 5,381,230 A | 1/1995 | Blake et al. | |
| 5,457,532 A | 10/1995 | August et al. | |
| 5,469,257 A * | 11/1995 | Blake | G01C 19/721 356/464 |
| 5,734,469 A | 3/1998 | Strandjord | |
| 9,115,994 B2 | 8/2015 | Strandjord et al. | |
| 9,121,708 B1 | 9/2015 | Qiu | |
| 9,329,413 B1 | 5/2016 | DeRose et al. | |
| 9,683,846 B2 | 6/2017 | Strandjord et al. | |
| 2014/0369699 A1 | 12/2014 | Strandjord et al. | |
| 2016/0003619 A1 | 1/2016 | Strandjord et al. | |
| 2017/0146346 A1* | 5/2017 | Strandjord | G01C 19/721 |

FOREIGN PATENT DOCUMENTS

| | | |
|---|---|---|
| EP | 3173742 A1 | 5/2017 |
| WO | 2017138949 A1 | 8/2017 |

\* cited by examiner

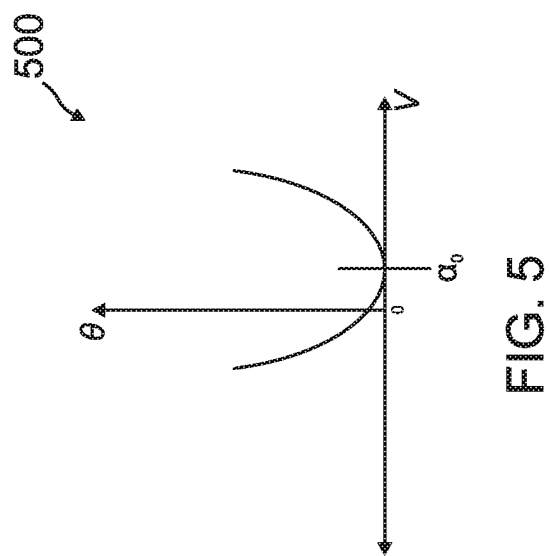

HYPERBOLIC MODULATION OFFSET ERROR REDUCER FOR AN RFOG

BACKGROUND

The resonator fiber optic gyro (RFOG) shows promise of meeting challenging demands of a large number of inertial guidance applications. To meet cost and size requirements, much of the RFOG laser source optical functions may be employed with silicon photonics (SiP) chip technology. Many of the optical functions such as waveguides, optical couplers and splitters, intensity modulators, and photodiodes can perform just as well or even better than their discrete optical device counterpart. However, an optical phase modulator is difficult to employ in silicon while meeting even-harmonic distortion requirements because of their inherent nonlinearity. This limitation can maybe overcome with the use of subharmonic modulation, where the inherent even-function nonlinearity is used as advantage to generate phase modulation at the desired frequency while meeting even harmonic distortion requirements. However, using subharmonic modulation introduces new sources of possible errors for the gyro. A gyro error can occur when either the voltage modulation drive or the SiP modulator voltage to phase transfer function has an offset. There is a need for a system and method to detect the relative offset between applied voltage and optical phase and control it to zero.

SUMMARY

The following summary is made by way of example and not by way of limitation. It is merely provided to aid the reader in understanding some of the aspects of the subject matter described. Embodiments provide a system and method to detect a relative offset between voltage and phase and control it to zero to meet harmonic distortion requirements.

In one embodiment, a hyperbolic modulation offset reducer circuit for a resonator fiber optic gyro is provided. The hyperbolic modulation offset reducer circuit includes an input to receive a transmission signal from a resonator, first demodulation circuit, a slave resonance tracking loop and a hyperbolic modulator offset control loop. The first demodulation circuit is configured to demodulate the received transmission signal at twice a sideband heterodyne detection modulation frequency to reject signals due to backscatter. The slave resonance tracking loop is coupled to an output of the first demodulation circuit. The slave resonance tracking loop is configured to create an offset frequency signal from the transmission signal. The slave resonance tracking loop includes a second demodulation circuit that is configured to demodulate the output of the first demodulation circuit at a select tracking demodulation frequency. The hyperbolic modulator offset control loop is also coupled to the output of the first demodulation circuit. The hyperbolic modulator offset control loop is configured to create a subharmonic common modulation signal and an offset from the transmission signal that is coupled to a common phase module in a silicon photonics chip of the resonator fiber optic gyro. The hyperbolic modulator offset control loop includes a third demodulation circuit that is configured to demodulate the output of the demodulation circuit at a select harmonic frequency.

In another example embodiment, a resonator fiber optic gyro is provided. The resonator fiber optic gyro includes a master laser, a clockwise (CW) slave laser, a CW optical phase lock loop (OPPL), a counterclockwise (CCW) slave laser, a CCW OPPL, a silicon photonics (SiP) chip, a silicon optical bench (SiOB), a resonator, a Pound-Drever-Hall (PDH) loop and a slave resonance tracking electronics with subharmonic modulation offset error reducer circuit. The CW optical phase lock loop (OPLL) is coupled to control the CW slave laser. The CCW OPLL is coupled to control the CCW slave laser. The CCW OPLL includes an OPLL mixer. A first input to the OPLL mixer coupled to receive an output of the CCW slave laser. The SiP chip has formed waveguides and beam splitter/combiners. Output laser beams from the master laser, the CW slave laser and the CCW slave laser are directed into the formed waveguides of the SiP chip. The SiP chip has a first output coupled to the CW OPLL, a second output coupled to the CCW OPLL, a third output that is in communication with an output of the CW slave laser and the master laser and a fourth output that is in communication with an output of the CCW slave laser. The SiOB includes a first circulator that has an input that is in communication with the third output of the SiP chip and a second circulator that has an input that is in communication with the fourth output of the SiP chip. The resonator is coupled between a first output of the first circulator and a first output of the second circulator. The (PDH) loop is coupled between an output of the SiOB and the master laser to control the frequency of the master laser. The slave resonance tracking electronics with subharmonic modulation offset error reducer circuit includes an input that is coupled to receive a transmission signal from a second output of one of the first circulator and the second circulator. The slave resonance tracking electronics with subharmonic modulation offset error reducer circuit is configured to generate an offset frequency signal based at least in part on a demodulation of the transmission signal at a tracking demodulation frequency. The offset frequency signal is coupled to a second input of the OPLL mixer in the CCW OPLL. The slave resonance tracking electronics with subharmonic modulation offset error reducer circuit is further configured to generate a subharmonic common modulation signal based at least in part on a demodulation of the transmission signal at a harmonic frequency. The subharmonic common modulation signal coupled to a common phase modulator in an output path of the master laser in the SiP chip.

In yet another embodiment, a method of reducing a hyperbolic modulation offset in a resonator fiber optic gyro (RFOG) is provided. The RFOG includes a master laser, a clockwise (CW) slave laser controlled by a CW optical phase lock loop (OPLL), a counterclockwise (CCW) slave laser controlled by a CCW OPLL, a silicon photonics (SiP) chip including waveguides and beam splitter/combiners, a first circulator coupled to an output of the master laser and CW slave laser, a second circulator coupled to an output of the CCW slave laser and a fiber resonator coupled between the first and second circulators. The method includes outputting a transmission signal from one of the first circulator and the second circulator. The transmission signal is demodulated at two times a sideband heterodyne detection signal frequency. In a slave resonance loop the demodulated transmission signal is demodulated at two times a subharmonic common modulation frequency at a first demodulation circuit. An output of the first demodulation circuit is added to a subharmonic modulation frequency to generate an offset frequency signal that is coupled to one of the CCW OPLL and the CW OPLL. In a hyperbolic modulator offset control loop, the demodulated transmission signal is further demodulated at three times a subharmonic common modulation frequency at a second demodulation circuit. An output of the second demodulation circuit is added to a subharmonic modulation frequency to generate a subharmonic common modulation signal that is coupled to a common phase modulator in the SiP chip.

BRIEF DESCRIPTION OF THE DRAWINGS

Embodiments can be more easily understood and further advantages and uses thereof will be more readily apparent, when considered in view of the detailed description and the following figures in which:

FIG. 5 is phase response graph that illustrates a SiP phase modulator phase response to an applied voltage.

In accordance with common practice, the various described features are not drawn to scale but are drawn to emphasize specific features relevant to the subject matter described. Reference characters denote like elements throughout Figures and text.

DETAILED DESCRIPTION

In the following detailed description, reference is made to the accompanying drawings, which form a part hereof, and in which is shown by way of illustration specific embodiments in which the inventions may be practiced. These embodiments are described in sufficient detail to enable those skilled in the art to practice the embodiments, and it is to be understood that other embodiments may be utilized and that changes may be made without departing from the spirit and scope of the present invention. The following detailed description is, therefore, not to be taken in a limiting sense, and the scope of the present invention is defined only by the claims and equivalents thereof.

Embodiments provide a system and method to detect a relative offset between voltage and phase and control it to zero to meet harmonic distortion requirements using a subharmonic modulation offset error reducer circuit. It will be understood that when a device or signal is referred to as being "coupled" to an element, it can be coupled directly to the element, or intervening elements may also be present.

Figure 1:
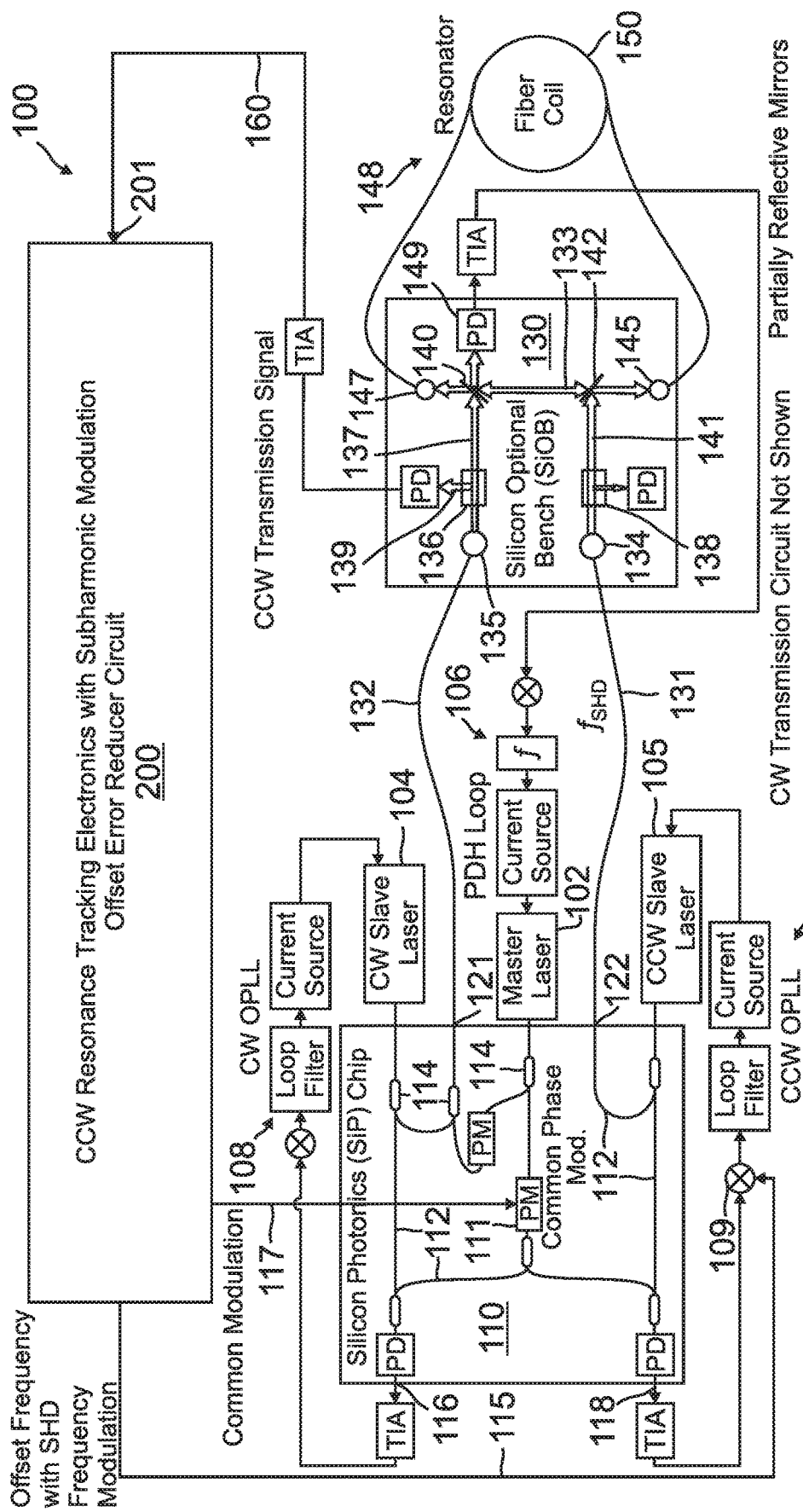
FIG. 1 is an illustration of a partial resonator fiber optic gyro (RFOG) according to one exemplary embodiment.

Referring to FIG. 1, a resonator fiber optic gyro (RFOG) 100 that includes a CCW slave laser resonance tracking with subharmonic modulation offset error reducer circuit 200 (hyperbolic modulation offset reducer circuit) is illustrated. As described below, the CCW slave laser resonance tracking electronics with subharmonic modulation offset error reducer circuit 200 provides modulation, demodulation, and control to lock the CCW slave laser onto the fiber resonator 148 transmission resonance peaks and provide an offset error reducer for subharmonic modulation to control a relative offset between applied voltage and optical phase. The RFOG 110, in this example, includes a master laser 102, a clockwise (CW) slave laser 104, a counterclockwise (CCW) slave laser 105, a silicon photonics (SiP) chip 110 and a silicon optical bench (SiOB) 130.

The SiP chip 110 includes formed waveguides 112 and waveguide beam splitters/combiners 114 that are used to direct laser beams from the respective master laser 102, the CW slave laser 104 and the CCW slave laser 105 through the SiP chip 110. A first photodiode electrical output 116 of the SiP chip 110 is coupled to a CW optical phase lock loop (OPLL) 108. The CW OPLL 108 controls the frequency of CW slave laser 104. A second photodiode electrical output 118 of the SiP chip 110 is combined with an offset frequency from an output of the CCW slave laser resonance tracking electronics with subharmonic modulation offset error reducer circuit 200 via an offset frequency signal communication link 115 using a mixer 109 in a CCW OPLL 120. The CCW OPLL 120 controls the frequency of the CCW slave laser 105. The offset frequency from resonance tracking electronics of the CCW slave laser resonance tracking with subharmonic modulation offset error reducer circuit 200 is frequency modulated at a relatively high frequency (typically greater than 1 MHz, which frequency modulates the CCW laser frequency to provide a means to reject optical backscatter errors. This method is referred to Sideband Heterodyne Detection (SHD). A third output 121 of the SiP chip 110 is coupled to optical fiber 132, which is coupled to SiOB 130. A fourth output 122 is coupled to optical fiber 131, which is coupled to SiOB 130. A subharmonic common modulation signal from a common communication link 117 from the CCW slave resonance tracking electronics with subharmonic modulation offset error reducer circuit 200 is coupled to a common phase modulator 111 in the path in the waveguides 112 of the SiP chip 110 of output of the master laser 102.

The SiOB 130 couples light in and out of the ring resonator and completes the resonator loop with tiny, free-space optical components. Light from fiber 132 is collimated by ball lens 135 and directed towards first circulator 136. The first circulator 136 has a first output 137 that directs light to first resonator input/output mirror 140, and a second output 139 that is coupled to provide a CCW transmission resonator output signal along a CCW transmission signal communication link 160 to an input 201 of the hyperbolic modulation offset reducer circuit for a resonator fiber optic gyro 200. Light from fiber 131 is collimated by ball lens 134 and directed towards second circulator 138. The second circulator 138 has a first output 141 that directs light to second resonator input/output mirror 142, and a second output 143 that is coupled to provide a CW transmission signal along a CW transmission circuit (not shown).

Resonator 148 consists of fiber coil 150, third ball lens 147, fourth ball lens 145, first partially reflecting mirror 140 and second partially reflecting mirror 142. A portion of CW light that resonates in resonator 148 is coupled out of the resonator by mirror 140 and directed towards photodetor 149, where it is interfered with light that was transmitted by mirror 140 from circulator output 137. The output of photodetector 149 is coupled to a Pound-Drever-Hall (PDH) loop 106 that controls the frequency of the master laser 102 to a frequency with a fixed offset from the center of a resonance dip detected at photodetector 149. A portion of the light circulating in the CCW direction of the resonator 148 is coupled out of the resonator by mirror 140 and directed towards circulator 136, which directs the resonator CCW output light to photodetector 139. Further in this embodiment, most of the light 133 recirculates through the resonator and passes through mirrors 140 and 142.

To sense rotation, a difference between the CW and CCW resonance frequencies of the fiber optic ring resonator 148 of the RFOG 100 is measured. To measure the resonance frequencies, two lasers (the CW slave laser 104 and the CCW slave laser 105) are used in an embodiment to probe the resonator 148 in both CW and CCW directions. Common phase modulation is applied to each laser beam going to the rotation sensing resonator to detect the resonance frequencies of the resonator 148. A frequency modulation, referred to as SHD modulation, at relatively high frequency is also applied to both CW and CCW lightwaves to reject signals due to optical backscatter. The SHD modulation produces a signal at the resonator output (output 139 of the first circulator 136 in this embodiment) at twice the frequency of the SHD modulation frequency when the laser carrier frequency are at some fixed offset from resonance, and the laser sidebands generated by the SHD modulation are on resonance. The common phase modulation produces an amplitude modulation (AM) on the resonator output signal at twice the SHD modulation frequency. The AM signal indicates when either the CCW laser carrier frequency is on or off resonance, or the odd laser modulation sidebands from SHD modulation is on or off resonance. The produced signal a the resonator output is first demodulated at twice the SHD modulation frequency, then at the subharmonic common modulation frequency, then fed back to the CCW laser to keep either it's carrier frequency on resonance or it's odd modulation sidebands.

The common phase modulation is typically applied at 7 kHz. Harmonic distortion from either the phase modulation drive electronics or the phase modulator can generate some phase modulation at 14 kHz, which can lead to a rotation sensing error. SiP phase modulators have a large nonlinearity which leads to large harmonic distortion. Some SiP phase modulators based on a thermal effect produce an optical phase that has quadratic response to drive voltage. For a SiP modulator with an ideal quadratic transfer function, a voltage modulation applied at 3.5 kHz will produce a phase modulation at 7 kHz and no phase modulation at 14 kHz. However, a relative offset between the voltage drive and phase can produce a rotation sensing error. An example of the offset is illustrated in FIG. 5. By demodulating the resonator output at the 3rd harmonic of the subharmonic modulation (10.5 kHz), an error signal is generated that can be used by a control loop to apply a dc voltage to the modulator 111 that counteracts the original offset, thus eliminates the associated error.

Although the resonator fiber optic gyro (RFOG) 100 is illustrated as employing a CCW slave resonance tracking electronics with subharmonic modulation offset error reducer circuit 200 (hyperbolic modulation offset reducer circuit) to reduce hyperbolic modulation offset error, a CW slave resonance tracking electronics with subharmonic modulation offset error reducer circuit may also be used in other embodiments. The CW slave resonance tracking electronics with subharmonic modulation offset error reducer circuit may implement the same components as the CCW slave resonance tracking electronics with subharmonic modulation offset error reducer circuit 200 where a CW transmission signal from the second output 143 of the second circulator 138 is coupled to an input of the CW slave resonance tracking electronics with subharmonic modulation offset error reducer circuit. There is always both a CCW and CW resonance tracking loop, but only one is required to have a subharmonic modulation offset error reducer circuit.

Figure 2:
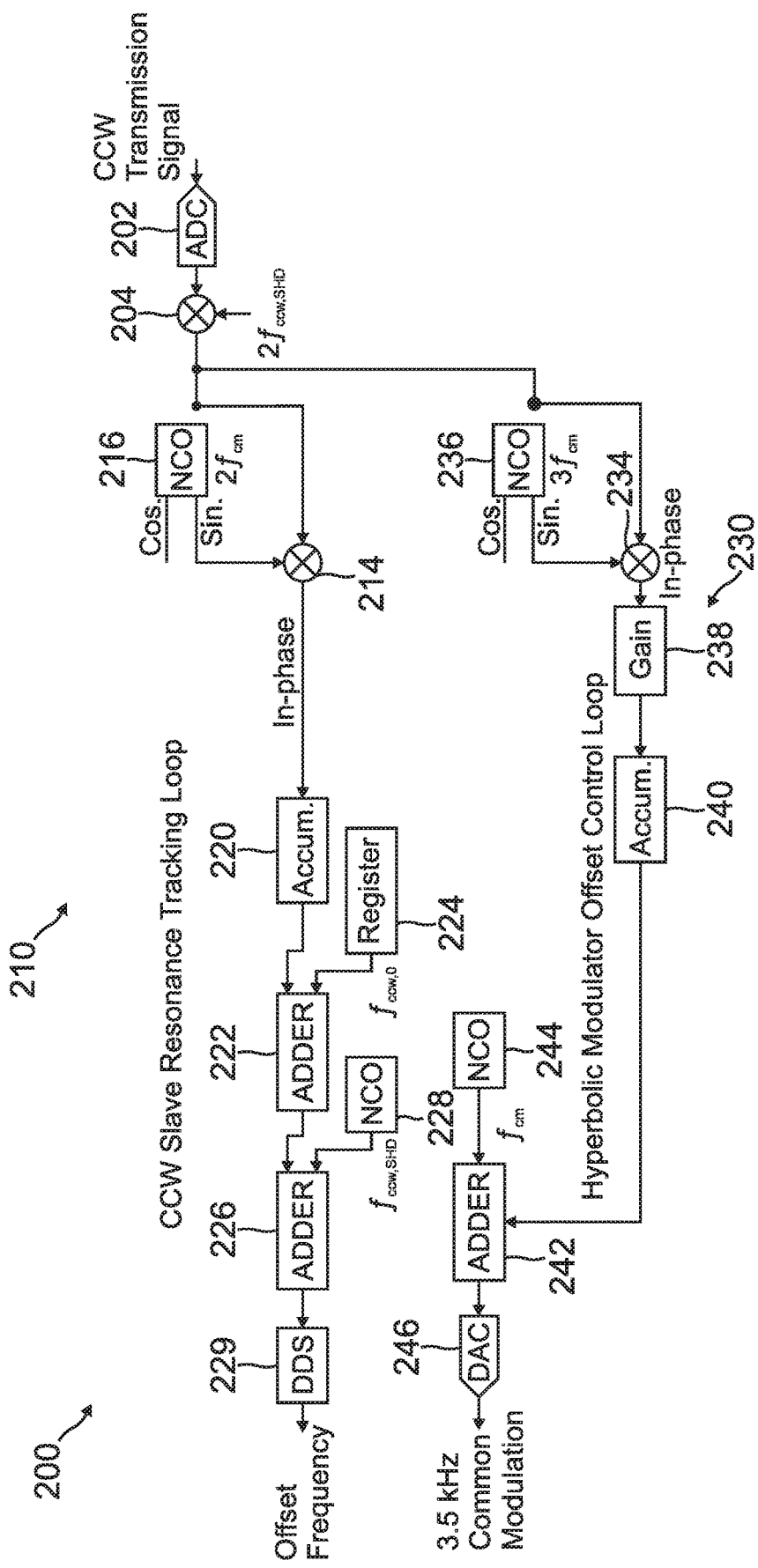
FIG. 2 is an illustration of a subharmonics modulation offset error reducer circuit according to one exemplary embodiment.

Referring to FIG. 2, an example embodiment of a CCW laser resonance tracking electronics with a subharmonic modulation offset error reducer circuit 200 (hyperbolic modulation offset reducer circuit) is illustrated. In this example embodiment, the CCW transmission signal from the first circulator 136 via the CCW transmission signal communication link 160 is coupled to an analog to digital converter (ADC) 202. An output of the ADC 202 is coupled to a first demodulation circuit formed with a first mixer 204. Mixer 204 (transmission signal mixer) mixes the transmission signal with a reference signal at twice the CCW SHD modulation frequency ($2f_{ccw}$, SHD). Backscattered light from the CW direction will produce a signal at twice the CW SHD modulation frequency ($2f_{cw}$, SHD) which is different than the CCW demodulation frequency and therefore is rejected by mixer 204. An output of mixer 204 is coupled to a CCW slave resonance tracking loop 210 and hyperbolic modulator offset control loop 230.

In the CCW slave resonance tracking loop 210, an output of mixer 204 is coupled to a second demodulation circuit that includes a second mixer 214 and a first NCO 216. In particular, the output of the mixer 204 is coupled to a first input of mixer 214. A second input to mixer 214 is coupled to receive a sine signal from NCO 216. A frequency (tracking demodulation frequency) of the sine signal from the NCO 216 is 2 times a subharmonic common modulation frequency. An output of mixer 214 is coupled to an accumulator 220. An output of accumulator 220 is coupled to a first input to an adder 222. Adder 222 further has a second input that is coupled to receive the signal from a register 224. An output of adder 222 is coupled to a first input of an adder 226. The second adder 226 further includes an input that is coupled to a NCO 228. The output of adder 226 is provided to a direct digital synthesizer (DDS) 229. The DDS 229 outputs a frequency modulated offset frequency that is coupled to mixer 109 in the CCW OPLL 120 discussed above. The frequency modulation of the offset frequency comes from NCO 228 and the carrier of the offset frequency comes from adder 222.

In the hyperbolic modulator offset control loop 230 the output of the mixer 204 is coupled to a third demodulation circuit formed by a third mixer 234 and a second NCO 236. In particular the output of mixer 204 is coupled to a first input to mixer 234. A second input to mixer 234 is coupled to receive a sine signal from NCO 236. The frequency (harmonic frequency) of the sine signal from NCO 236 is 3 times the frequency of the subharmonic common modulation. An output of mixer 234 is coupled to a gain circuit 238. An output of the gain circuit 238 is coupled to an accumulator 240. In output of the accumulator 240 is coupled to a first input of an adder 242. A second input of the adder 242 is coupled to receive a signal from NCO 244. In an embodiment, the NCO 244 provides a digital subharmonic modulation of 3.5 kHz (which is the frequency of the subharmonic common modulation) to the adder 242. An output of adder 242 (which is a DC offset added to the 3.5 kHz modulation from the NCO 244) is coupled to a digital to analog converter (DAC) 246. An output of the DAC 246 provides the subharmonic common modulation signal to the common communication link 117.

In an embodiment, a demodulation at 7 kHz (twice the 3.5 kHz) occurs at mixer 214 in the CCW slave resonance tracking loop 210. A demodulation at 10.5 kHz (three times the 3.5 kHz) (or other harmonic of the 3.5 kHz) occurs at mixer 234 in the hyperbolic modulator offset control loop 230. The hyperbolic modular offset control loop 230 controls the offset applied to the subharmonic common modulation to null out the 10.5 kHz demodulator output. Nulling out the 10.5 kHz demodulator output will reduce or eliminate gyroscope bias errors from dc offset errors in the hyperbolic modulation. Although exact frequencies 7 kHz (two times the subharmonic common modulation frequency), 3.5 kHz (subharmonic common modulation frequency) and 10.3 kHz (three times the subharmonic common modulation frequency) are discussed above, the frequencies do not have to be exact in embodiments. For example, the 7 kHz may typically be in a range of 1 kHz to 50 kHz. The frequency of 3.5 kHz discussed above is always one half of the 7 kHz frequency, so its range would be typically be from 500 Hz to 25 kHz. The 10.5 kHz discussed above is always three times the 3.5 kHz, so its range would be typically between 1.5 kHz to 75 KHz.

Figure 3:
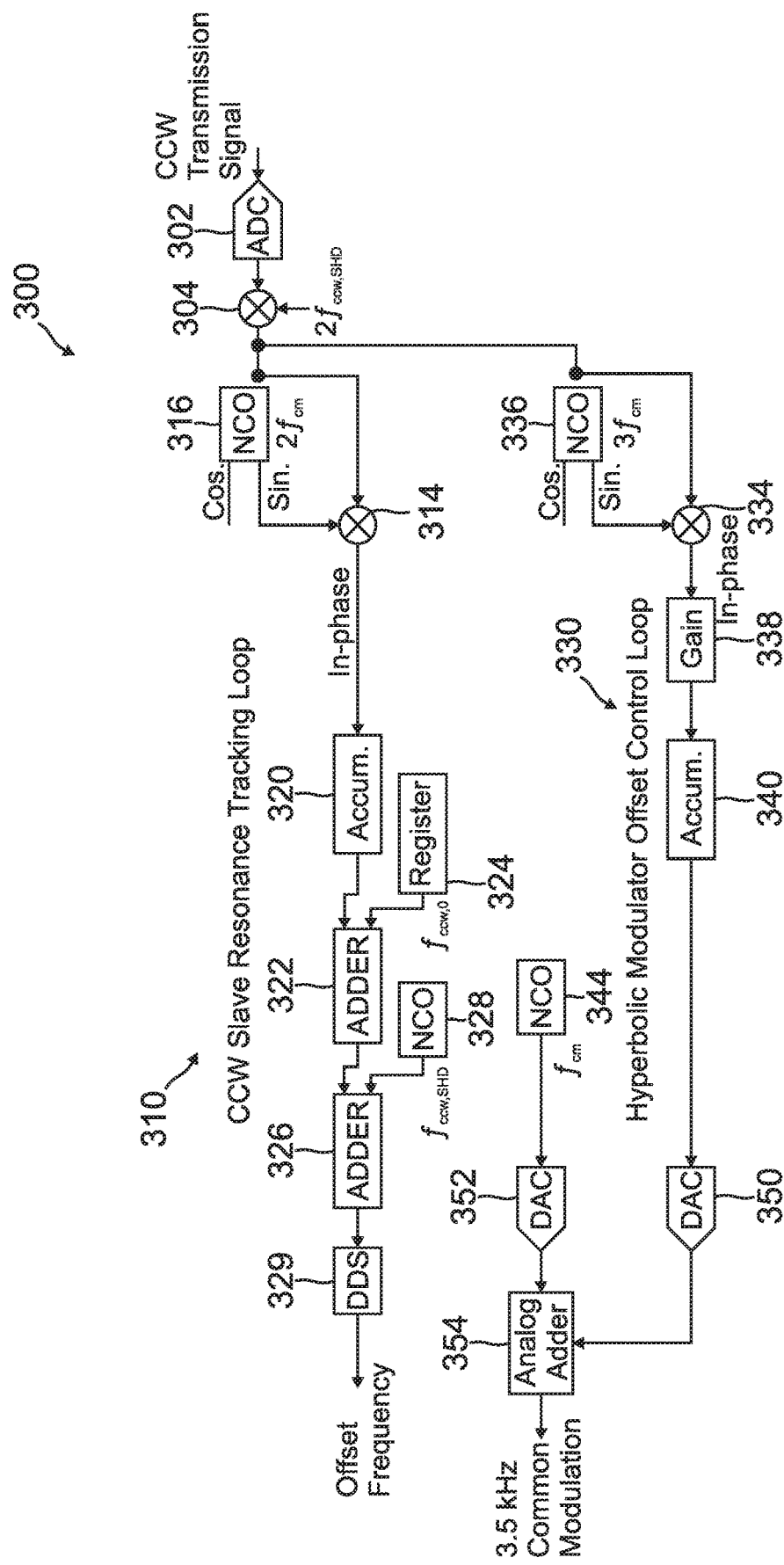
FIG. 3 is an illustration of a subharmonics modulation offset error reducer circuit according to another exemplary embodiment.

Another example embodiment of a subharmonic modulation offset error reducer circuit 300 is illustrated in FIG. 3. Similar to the embodiment of FIG. 2, the subharmonic modulation offset error reducer circuit 300 of FIG. 3 includes a CCW slave resonance tracking loop 310 and hyperbolic modulator offset control loop 330. The CCW transmission signal from the first circulator 136 via the CCW transmission signal communication link 160 is coupled to an analog to digital converter (ADC) 302. An output of the ADC 302 is coupled to a first demodulation circuit formed in part by a first mixer 304. Mixer 304 mixes in a $2f_{ccw}$, SHD signal. An output of the mixer 304 is coupled to the CCW slave resonance tracking loop 310 and the hyperbolic modulator offset control loop 330.

In the CCW slave resonance tracking loop 310, an output of mixer 304 is coupled to a second demodulation circuit formed from a second mixer 314 and NCO 316. In particular, the output of the first mixer 304 is coupled to a first input of the second mixer 314. Mixer 314 has a second input that is coupled to receive a sine signal from NCO 316. The frequency of the sine signal is two times the frequency of the subharmonic common modulation frequency. An output of mixer 314 is coupled to an accumulator 320. An output of accumulator 320 is coupled to a first input to an adder 322. Adder 322 further has a second input that is coupled to receive the signal from a register 324. An output of adder 322 is coupled to a first input of an adder 326. Adder 326 further includes an input that is coupled to a NCO 328. In output of adder 326 is provided to a DDS 329. The DDS 329 outputs a frequency modulated offset frequency that is coupled to mixer 109 in the CCW OPPL of the RFOG 100 as discussed above.

In the hyperbolic modulator offset control loop 330 the output of the first mixer 304 is coupled to a third demodulation circuit formed with a third mixer 334 and a second NCO 336. In particular, the output of the first mixer 304 is coupled to an input of the third mixer 334. A second input to mixer 334 is coupled to receive a sine signal from the NCO 336. The frequency of the sine signal is three times the frequency of the subharmonic common modulation frequency. An output of mixer 334 is coupled to a gain circuit 338. An output of the gain circuit 338 is coupled to an accumulator 340. In output of the accumulator 340, in this embodiment, is coupled to a DAC 350. An output of DAC 350 it coupled to a first input of an analog adder 354. An NCO 344 provides a modulation signal to an input to a DAC 352. An output of DAC 352 is coupled to a second input of analog adder 354. An output of the analog adder 354 provides the subharmonic common modulation signal along with a dc value to the common communication link 117 in this embodiment.

In this embodiment, direct current (DC) offset can be summed with the 3.5 kHz subharmonic common modulation in analog electronics if additional resolution of the DC offset is required. Adder 354 can be configured to perform a weighted sum, whereas a larger DC offset is effectively attenuated before being summed with the 3.5 kHz modulation from NCO 344.

Figure 4:
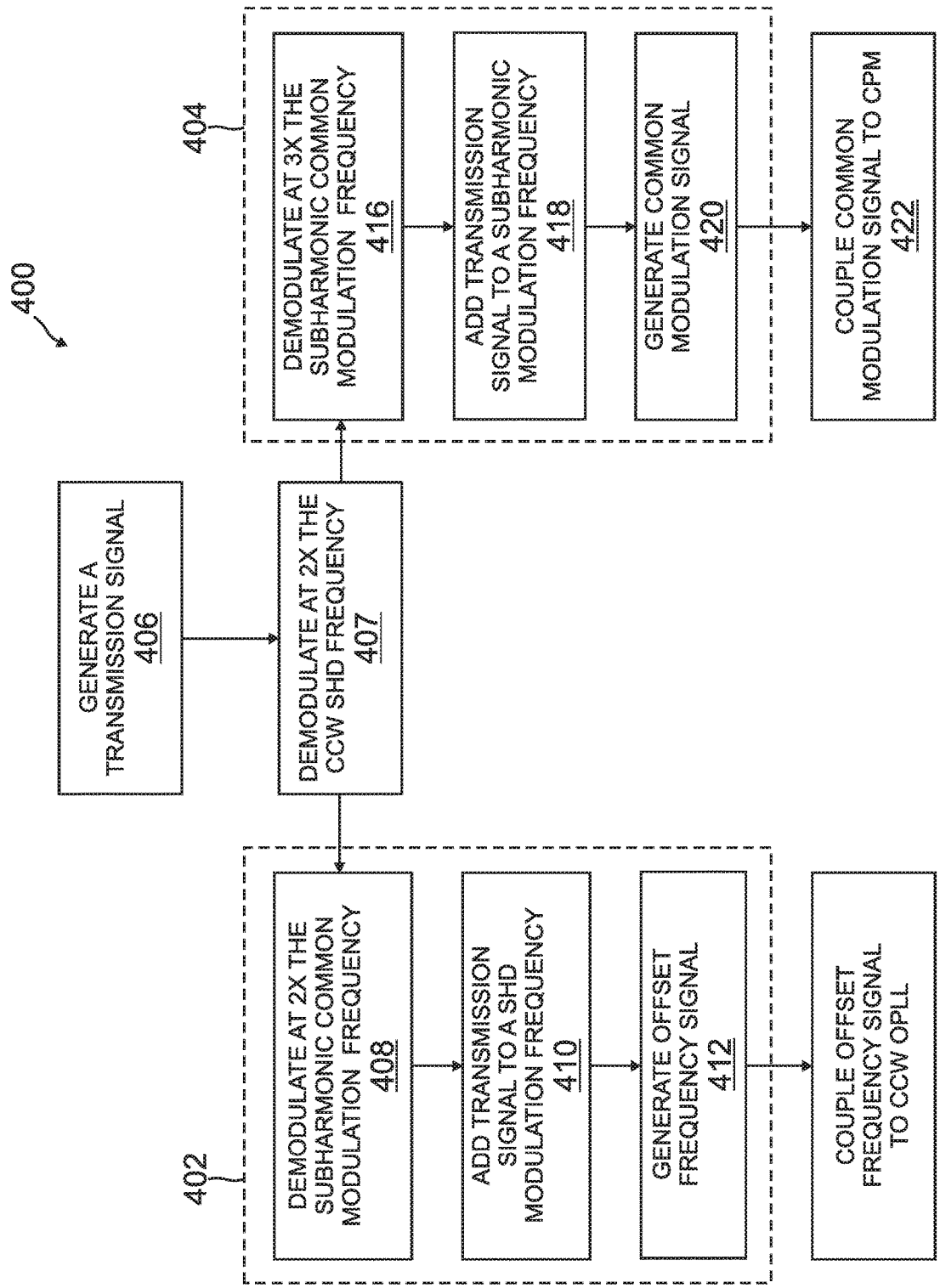
FIG. 4 is a subharmonic modulation offset error reducer flow diagram according to one exemplary embodiment.

Referring to FIG. 4, a subharmonic modulation offset error reducer flow diagram 400 according to an embodiment is illustrated. The blocks of the flow diagram are provided in sequential order in FIG. 4. However, it will also be understood that, in other implementations, the function(s) noted in the blocks may occur out of the order described, that the functions described in separate blocks may be combined, and/or that the functions described in a single block may be broken out into multiple blocks.

As illustrated in the example embodiment of FIG. 4, the process begins by generating a transmission signal at block (406). As discussed, the transmission signal is provided by the resonator 148 and in particular in an embodiment, circulator 136 of the resonator 148. However, in another embodiment, the transmission signal can be provided from circulator 138 to a CW slave resonance tracking electronics with subharmonic modulation offset error reducer circuit (not shown) that has the same components as the CCW slave resonance tracking electronics with subharmonic modulation offset error reducer circuit 200 discussed above. Hence, embodiments are not limited to a CCW slave resonance tracking electronics with subharmonic modulation offset error reducer circuit 200.

In an embodiment, the transmission signal form the respective circulator 136 or 138 is first demodulated at twice the CCW SHD frequency at block (407). If a CW slave resonance tracking electronics with subharmonic modulation offset error reducer circuit is used the transmission signal will be demodulated at twice a CW SHD frequency. The demodulated signal is then provided to both the slave resonance tracking loop 210 or 310 and the hyperbolic modulator offset control loop 230 or 330. Processes in the slave resonance tracking loop are generally shown in box 402 and processes in the hyperbolic modulator offset control loop are general shown in box 404.

In the slave resonance tracking loop 210 or 310, this occurs at mixer 204 of the embodiment of FIG. 2 or at mixer 304 of the embodiment of FIG. 3. As discussed, this first demodulation by mixer 204 or 304 at the CCW SHD frequency is used to reject backscattered light form the CW direction. Next, the signal is demodulated a second time a twice the subharmonic common modulation frequency at block (408). In an embodiment, the demodulation reference signal is provided by an NCO (such a NCO 220 and 316) at 7 kHz. In the embodiment of FIG. 2, this occurs at mixer 214 and in the embodiment of FIG. 3 this occurs at mixer 314. The demodulated CCW transmission signal is then added to a modulation at a select SHD modulation frequency at block (410). The modulated signal provides an offset frequency signal at block (412). The offset frequency signal is then coupled to the CCW OPLL 120 at block (414).

The processes of the hyperbolic modular offset correction loop 404 starts with the demodulation signal from block (407). This signal is then demodulated a second time at three times the subharmonic common modulation frequency at block (416). In an embodiment, the demodulation reference signal is provided by an NCO (such as NCO 236 and 336) at 10.5 kHz. The demodulate transmission signal is then added to subharmonic modulation frequency at step (418). In one example the select subharmonic modulation frequency is 3.5 kHz. In one embodiment, a DC offset is added to the 3.5 kHz modulation by adder 242 or 354. A subharmonic common modulation signal is generated by the modulation at block (420). The subharmonic common modulation signal is coupled to a common phase modulator 111 in the SiP chip 110 at block (422).

FIG. 5 is an optical phase response graph 500 that illustrates a SiP phase modulator optical phase response to an applied voltage.

$$\theta = k_2(V-a_0)^2$$

The above equation illustrates a voltage to phase function of a non-ideal hyperbolic phase modulator. The voltage applied to the modulator is V, $k_2$ is a scale factor and $a_0$ is an erroneous offset due to some imperfection is the hyperbolic phase modulator.

The following equation shows a voltage subharmonic modulation with a sinusoidal term at angular frequency $\omega_{cm}$ and amplitude $V_1$ and a dc offset term $V_0$.

$$V = V_0 + V_1 \sin(\omega_{cm} t)$$

If the gyro resonator output intensity function with round trip optical phase is approximated with a quadratic function, which is good when the modulation amplitudes are sufficiently small, the mixers 214 or 314 outputs, when the slave laser carrier or odd SHD modulation sidebands are on resonance, can be expressed as the following equation:

$$V_{m\_a} = \tfrac{1}{2}(2k_2 V_1)^2 (V_0 - a_0)^2$$

When the CCW slave laser carrier or SHD odd modulation sidebands are on resonance, the desired output of mixers 214 or 314 is zero. However, the above equation shows that mixers 214 or 314 will have a non-zero output if V0 is not equal to a0. The below equation shows the outputs of mixers 234 or 334.

$$V_{m\_b} = 2k_2 V_1^3 (V_0 - a_0)$$

It can be shown that the outputs of mixers 234 or 234 is relatively insensitive to small laser frequency deviations from a resonator resonance frequency. The above equation shows that the outputs of mixers 234 or 334 will be zero if $V_0$ is equal to $a_0$. Therefore, mixer outputs 234 or 334 can be used in a feedback loop to control V0 to equal a0. The $V_{m\_a}$ equation shows if $V_0$ is made equal to $a_0$, then gyro bias offset errors induced by offset errors in the hyperbolic modulation will be zeroed out.

EXAMPLE EMBODIMENTS

Example 1 is a hyperbolic modulation offset reducer circuit for a resonator fiber optic gyro. The hyperbolic modulation offset reducer circuit includes an input to receive a transmission signal from a resonator, first demodulation circuit, a slave resonance tracking loop and a hyperbolic modulator offset control loop. The first demodulation circuit is configured to demodulate the received transmission signal at twice a sideband heterodyne detection modulation frequency to reject signals due to backscatter. The slave resonance tracking loop is coupled to an output of the first demodulation circuit. The slave resonance tracking loop is configured to create an offset frequency signal from the transmission signal. The slave resonance tracking loop includes a second demodulation circuit that is configured to demodulate the output of the first demodulation circuit at a select tracking demodulation frequency. The hyperbolic modulator offset control loop is also coupled to the output of the first demodulation circuit. The hyperbolic modulator offset control loop is configured to create a subharmonic common modulation signal and an offset from the transmission signal that is coupled to a common phase module in a silicon photonics chip of the resonator fiber optic gyro. The hyperbolic modulator offset control loop includes a third demodulation circuit that is configured to demodulate the output of the demodulation circuit at a select harmonic frequency.

Example 2, includes the subharmonic modulation offset reducer circuit of Example 1, wherein the tracking demodulation frequency is two times a subharmonic common modulation frequency and the harmonic frequency is three times the subharmonic common modulation frequency.

Example 3 includes the subharmonic modulation offset reducer circuit of any of the Examples 1-2, wherein the subharmonic common modulation frequency is 3.5 kHz.

Example 4 includes the subharmonic modulation offset reducer circuit of Example 3, wherein the second demodulation circuit of the slave resonance tracking loop further includes a first numerically controlled oscillator (NCO) and a first mixer. The first mixer having a first input coupled to an output of the first demodulation circuit and a second input coupled to an output of the first NCO.

Example 5 includes the subharmonic modulation offset reducer circuit of Example 3, wherein the slave resonance tracking loop further includes a first accumulator, a first adder, a second adder and direct digital synthesizer. The first accumulator is coupled to an output of the first mixer. The first adder has a first input that is coupled to an output of the first accumulator and second input that is coupled to an output of a register. The second adder has a first input that is coupled to an output of the first adder and a second input that is coupled to a second NCO. The direct digital synthesizer is coupled to an output of the second adder. The direct digital synthesizer outputs the offset frequency.

Example 6 includes the subharmonic modulation offset reducer circuit of any of the Examples 1-5, wherein the third demodulation circuit of the hyperbolic modulator offset control loop further includes a second NCO and a second mixer. The second mixer has a first input coupled to the output of the first demodulation circuit. The second mixer has a second input that is coupled to an output of the second NOC.

Example 7 includes the subharmonic modulation offset reducer circuit of Example 6, wherein the hyperbolic modulator offset control loop further includes a third NCO and an adder. The third NCO includes an output that outputs a subharmonic common modulation frequency. The adder has a first input that is in communication with an output of the second mixer and a second input that is coupled to the output of the third NCO.

Example 8 includes the subharmonic modulation offset reducer circuit of any of the Examples 6-7, wherein the hyperbolic modulator offset control loop further includes a gain circuit, a second accumulator, a second adder, a third adder and digital to analog converter. The gain circuit is coupled to an output of the third mixer. The second accumulator is coupled to an output of the gain circuit. The second adder has a first input coupled to an output of the second accumulator. A third adder has a first input that is coupled to an output of the second accumulator and a second input coupled to an output of a fourth NCO. The digital to analog converter having an input coupled to an output of the third adder and an output that provides the subharmonic common modulation signal.

Example 9 includes the subharmonic modulation offset reducer circuit of any of the Examples 6-7, wherein the hyperbolic modulator offset control loop further includes a gain circuit, a second accumulator, a first digital to analog converter (DAC), a fourth NCO, a second DAC and an analog adder. The gain circuit is coupled to an output of the third mixer. The second accumulator is coupled to an output of the gain circuit. The first digital to analog converter (DAC) has an input that is coupled to an output of the second accumulator. The second DAC has an output that is coupled to an output of the fourth NCO. The analog adder has a first input that is coupled an output of the first DAC and a second input that is coupled to an output of the second DAC. An output of the analog adder provides the subharmonic common modulation signal.

Example 10 is a resonator fiber optic gyro that includes a master laser, a clockwise (CW) slave laser, a CW optical phase lock loop (OPPL), a counterclockwise (CCW) slave laser, a CCW OPPL, a silicon photonics (SiP) chip, a silicon optical bench (SiOB), a resonator, a Pound-Drever-Hall (PDH) loop and a slave resonance tracking electronics with subharmonic modulation offset error reducer circuit. The CW optical phase lock loop (OPLL) is coupled to control the CW slave laser. The CCW OPLL is coupled to control the CCW slave laser. The CCW OPLL includes an OPLL mixer. A first input to the OPLL mixer coupled to receive an output of the CCW slave laser. The SiP chip has formed waveguides and beam splitter/combiners. Output laser beams from the master laser, the CW slave laser and the CCW slave laser are directed into the formed waveguides of the SiP chip. The SiP chip has a first output coupled to the CW OPLL, a second output coupled to the CCW OPLL, a third output that is in communication with an output of the CW slave laser and the master laser and a fourth output that is in communication with an output of the CCW slave laser. The SiOB includes a first circulator that has an input that is in communication with the third output of the SiP chip and a second circulator that has an input that is in communication with the fourth output of the SiP chip. The resonator is coupled between a first output of the first circulator and a first output of the second circulator. The (PDH) loop is coupled between an output of the SiOB and the master laser to control the frequency of the master laser. The slave resonance tracking electronics with subharmonic modulation offset error reducer circuit includes an input that is coupled to receive a transmission signal from a second output of one of the first circulator and the second circulator. The slave resonance tracking electronics with subharmonic modulation offset error reducer circuit is configured to generate an offset frequency signal based at least in part on a demodulation of the transmission signal at a tracking demodulation frequency. The offset frequency signal is coupled to a second input of the OPLL mixer in the CCW OPLL. The slave resonance tracking electronics with subharmonic modulation offset error reducer circuit is further configured to generate a subharmonic common modulation signal based at least in part on a demodulation of the transmission signal at a harmonic frequency. The subharmonic common modulation signal coupled to a common phase modulator in an output path of the master laser in the SiP chip.

Example 11 includes the resonator fiber optic gyro of Example 10, wherein the tracking demodulation frequency, the harmonic frequency and the control frequency all have a fixed relative phase.

Example 12 includes the resonator fiber optic gyro of any of the Examples 10-11, wherein the slave resonance tracking electronics with subharmonic modulation offset error reducer circuit further includes a transmission signal mixer having a first input to receive the transmission signal and a second input to receive a reference signal that is twice a sideband heterodyne detection frequency.

Example 13 includes the resonator fiber optic gyro of any of the Examples 10-12, wherein the slave resonance tracking electronics with subharmonic modulation offset error reducer circuit further includes a slave resonance tracking loop and a hyperbolic modular offset control loop. The slave resonance tracking loop is configured to create the offset frequency signal from the transmission signal. The slave resonance tracking loop includes a first demodulation circuit that is configured to demodulate the transmission signal at the tracking demodulation frequency and a first modulation circuit that is configured to add an output of the first demodulation circuit to a first subharmonic frequency. The hyperbolic modulator offset control loop is configured to create the subharmonic common modulation signal from the transmission signal. The a hyperbolic modulator offset control loop includes a second demodulation circuit that is configured to demodulate the transmission signal at the harmonic frequency and a second modulation circuit that is configured to add an output of the second demodulation circuit to a second subharmonic modulation frequency.

Example 14 includes the resonator fiber optic gyro of any Examples 13, wherein the first demodulation circuit of the slave resonance tracking loop further includes a first mixer and at least one adder. The first mixer has a first input that is coupled to an output of the transmission signal mixer and a second input that is coupled to a first numerically controlled oscillator (NCO). The at least one adder has a first input that is coupled to an output of the first mixer and a second input coupled to a second NCO.

Example 15 includes the resonator fiber optic gyro of any Examples 13, wherein the second demodulation circuit of the hyperbolic modulator offset control loop further includes a second mixer and an adder. The second mixer has a first input that is coupled an output of the transmission signal mixer and a second input that is coupled to a third numerically controlled oscillator. The adder has a first input that is coupled to an output of the second mixer and a second input that is coupled to a fourth NCO.

Example 16 is a method of reducing a hyperbolic modulation offset in a resonator fiber optic gyro (RFOG) wherein the RFOG includes a master laser, a clockwise (CW) slave laser controlled by a CW optical phase lock loop (OPLL), a counterclockwise (CCW) slave laser controlled by a CCW OPLL, a silicon photonics (SiP) chip including waveguides and beam splitter/combiners, a first circulator coupled to an output of the master laser and CW slave laser, a second circulator coupled to an output of the CCW slave laser and a fiber resonator coupled between the first and second circulators. The method includes outputting a transmission signal from one of the first circulator and the second circulator. The transmission signal is demodulated at two times a sideband heterodyne detection signal frequency. In a slave resonance loop the demodulated transmission signal is further demodulated at two times a subharmonic common modulation frequency at a first demodulation circuit. An output of the first demodulation circuit is added to a subharmonic modulation frequency to generate an offset frequency signal that is coupled to one of the CCW OPLL and the CW OPLL. In a hyperbolic modulator offset control loop, the demodulated transmission signal is further demodulated at three times a subharmonic common modulation frequency at a second demodulation circuit. An output of the second demodulation circuit is added to a subharmonic modulation frequency to generate a subharmonic common modulation signal that is coupled to a common phase modulator in the SiP chip.

Example 17 includes the methods of Example 16, further wherein the subharmonic common modulation frequency is 3.5 khz.

Example 18 includes the methods of any of the Examples 16-17, wherein the demodulating of the transmission signal at two times a sideband heterodyne detection signal further includes coupling the transmission signal to a first input of a first mixer and coupling a first output of a first numerically controlled oscillator that generates the two times the sideband heterodyne detection signal frequency to a second input of the first mixer.

Example 19 includes the methods of Examples 16-18, wherein demodulating the demodulated transmission signal at two times a subharmonic common modulation frequency at the first demodulation circuit further includes coupling an output of the first mixer to a first input of a second mixer and coupling a second input of the second mixer to an output of a second numerically controlled oscillator that generates the two times the subharmonic common modulation frequency.

Example 20 includes the methods of Examples 16-18, wherein demodulating the demodulated transmission signal at three times the subharmonic common modulation frequency at the second demodulation circuit further includes coupling an output of the first mixer to a first input of a third mixer and coupling a second input of the third mixer to an output of a third numerically controlled oscillator that generates the three times the subharmonic common modulation frequency.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

The invention claimed is:

1. A hyperbolic modulation offset reducer circuit for a resonator fiber optic gyro, the hyperbolic modulation offset reducer circuit comprising:
   an input to receive a transmission signal from a resonator;
   a first demodulation circuit configured to demodulate the received transmission signal at twice a sideband heterodyne detection modulation frequency to reject signals due to backscatter;
   a slave resonance tracking loop coupled to an output of the first demodulation circuit, the slave resonance tracking loop configured to create an offset frequency signal from the transmission signal, the slave resonance tracking loop including,
      a second demodulation circuit configured to demodulate the output of the first demodulation circuit at a select tracking demodulation frequency; and
   a hyperbolic modulator offset control loop coupled to the output of the first demodulation circuit, the hyperbolic modulator offset control loop configured to create a subharmonic common modulation signal and a offset from the transmission signal that is coupled to a common phase module in a silicon photonics chip of the resonator fiber optic gyro, the a hyperbolic modulator offset control loop including,
      a third demodulation circuit configured to demodulate the output of the demodulation circuit at a select harmonic frequency.

2. The subharmonic modulation offset reducer circuit of claim 1, wherein the tracking demodulation frequency is two times a subharmonic common modulation frequency and the harmonic frequency is three times the subharmonic common modulation frequency.

3. The subharmonic modulation offset reducer circuit of claim 2, wherein the subharmonic common modulation frequency is 3.5 kHz.

4. The subharmonic modulation offset reducer circuit of claim 1, wherein the second demodulation circuit of the slave resonance tracking loop further comprises:
   a first numerically controlled oscillator (NCO); and
   a first mixer having a first input coupled to an output of the first demodulation circuit and a second input coupled to an output of the first NCO.

5. The subharmonic modulation offset reducer circuit of claim 3, wherein the slave resonance tracking loop further comprises:
   a first accumulator coupled to an output of the first mixer;
   a first adder having a first input coupled to an output of the first accumulator and second input coupled to an output of a register;
   a second adder having a first input coupled to an output of the first adder and a second input coupled to a second NCO; and
   a direct digital synthesizer coupled to an output of the second adder, the direct digital synthesizer outputting the offset frequency.

6. The subharmonic modulation offset reducer circuit of claim 1, wherein the third demodulation circuit of the hyperbolic modulator offset control loop further comprises:
   a second NCO; and
   a second mixer having a first input coupled to the output of the first demodulation circuit, the second mixer having a second input coupled to an output of the second NOC.

7. The subharmonic modulation offset reducer circuit of claim 6, wherein the hyperbolic modulator offset control loop further comprises:
   a third NCO including an output that outputs a subharmonic common modulation frequency;
   an adder having a first input in communication with an output of the second mixer and a second input coupled to the output of the third NCO.

8. The subharmonic modulation offset reducer circuit of claim 6, wherein the hyperbolic modulator offset control loop further comprises:
   a gain circuit coupled to an output of the third mixer;
   a second accumulator coupled to an output of the gain circuit;
   a second adder having a first input coupled to an output of the second accumulator;
   a third adder having a first input coupled to an output of the second accumulator and a second input coupled to an output of a fourth NCO; and
   a digital to analog converter having an input coupled to an output of the third adder and an output that provides the subharmonic common modulation signal.

9. The subharmonic modulation offset reducer circuit of claim 6, wherein the hyperbolic modulator offset control loop further comprises:
   a gain circuit coupled to an output of the third mixer;
   a second accumulator coupled to an output of the gain circuit;
   a first digital to analog converter (DAC) having an input coupled to an output of the second accumulator;
   a fourth NCO;
   a second DAC having an output coupled to an output of the fourth NCO;
   an analog adder having a first input coupled an output of the first DAC and a second input coupled to an output of the second DAC, an output of the analog adder providing the subharmonic common modulation signal.

* * * * *